United States Patent [19]

Fleming

[11] 4,002,438

[45] Jan. 11, 1977

[54] ORGANIC CONVERSION SYSTEM

[76] Inventor: Joseph Fleming, 15925 McDermitt St., Fountain Valley, Calif. 92708

[22] Filed: Jan. 22, 1975

[21] Appl. No.: 543,176

[52] U.S. Cl. .............................. 48/76; 23/277 R; 44/2; 48/63; 48/111; 48/209

[51] Int. Cl.² ..................... C10J 3/48; C10J 3/56

[58] Field of Search .......... 48/111, 76, 197 R, 210, 48/209, 197 A, DIG. 4, 63; 23/277 R; 44/2, 80; 208/8

[56] References Cited

UNITED STATES PATENTS

| | | | |
|---|---|---|---|
| 2,514,288 | 7/1950 | Nicholson | 48/DIG. 4 |
| 2,608,526 | 8/1952 | Rex | 201/31 |
| 2,713,590 | 7/1955 | Palmer et al. | 48/DIG. 4 |
| 3,039,955 | 6/1962 | Honnold | 208/8 |
| 3,671,209 | 6/1972 | Teichmann et al. | 48/209 |
| 3,698,882 | 10/1972 | Garrett et al. | 48/209 X |
| 3,733,255 | 5/1973 | Appell et al. | 48/209 X |
| 3,736,233 | 5/1973 | Sass et al. | 48/210 |
| 3,846,096 | 11/1974 | Mullan et al. | 48/209 |

Primary Examiner—S. Leon Bashore
Assistant Examiner—Peter F. Kratz
Attorney, Agent, or Firm—Lyon & Lyon

[57] ABSTRACT

There is disclosed herein a method and an apparatus for converting organic materials into a high quality fuel product. The process involves introducing the organic materials into a stream heated to a temperature of about 1600° – 2000° F and comprised of a carrier gas and a hard, particulate material. The organic material is rapidly converted into a fuel product which is then separated from the stream. The process can be used to form either a liquid or gaseous fuel product.

3 Claims, 3 Drawing Figures

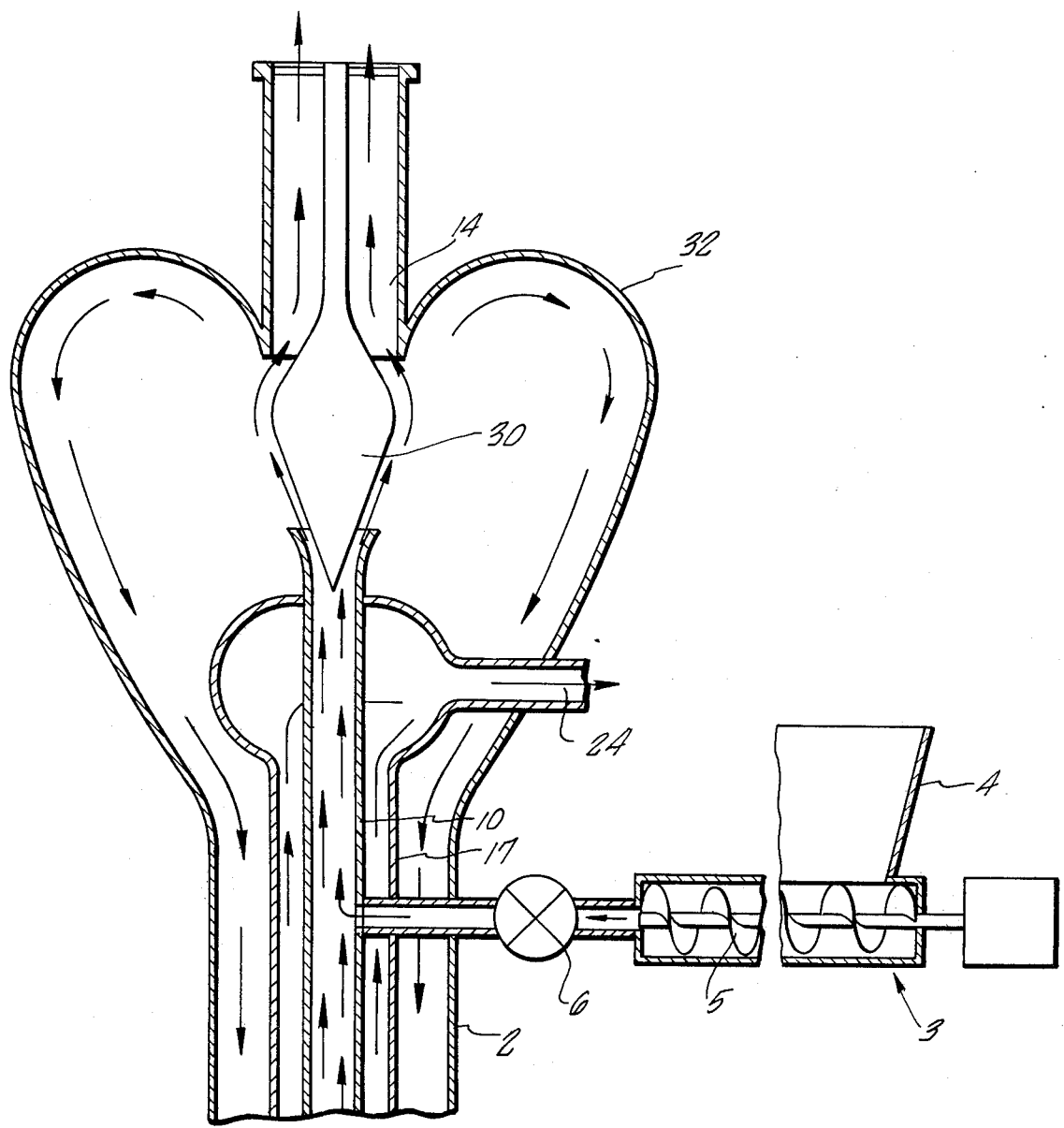

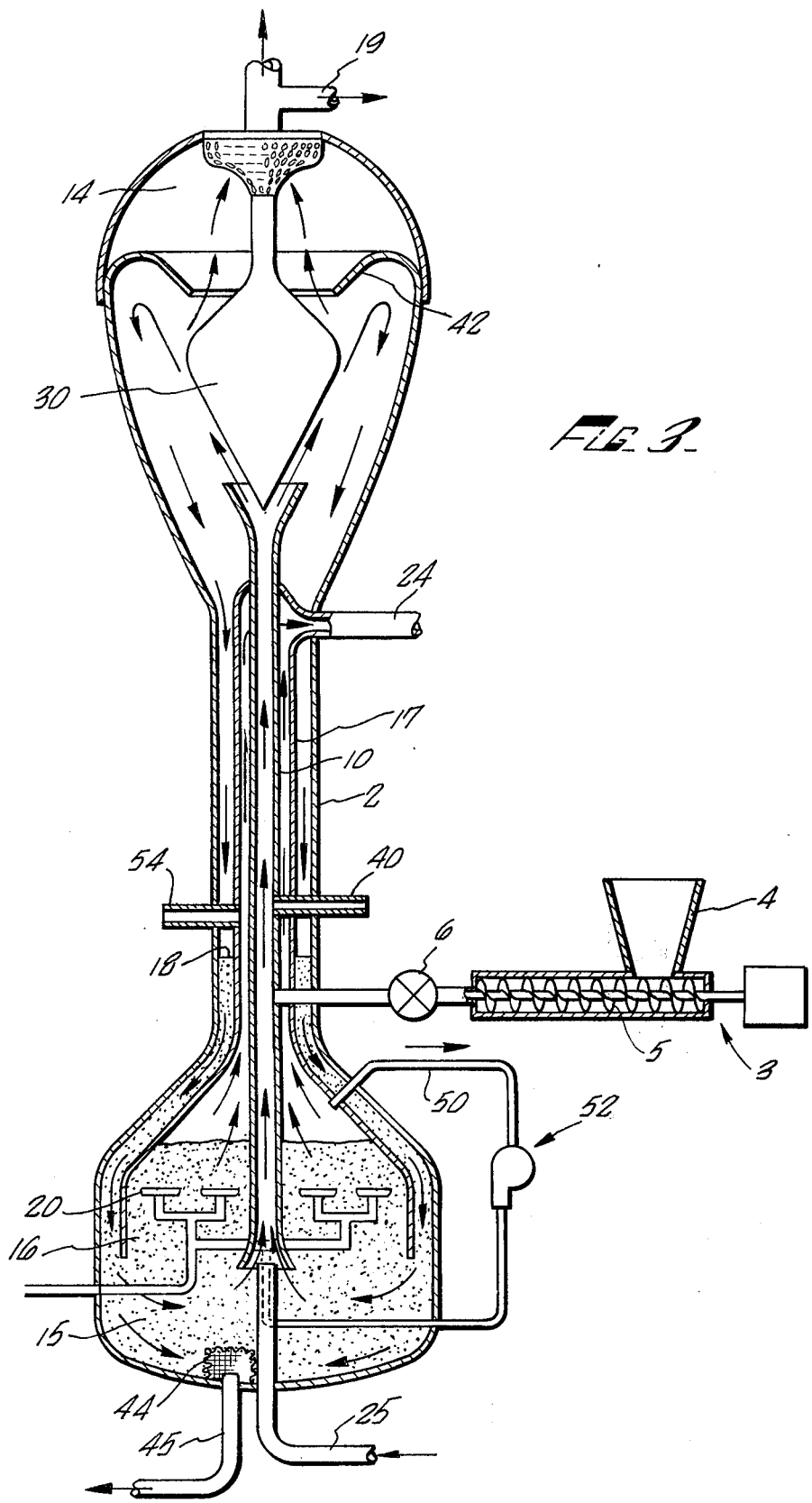

ORGANIC CONVERSION SYSTEM

BACKGROUND OF THE INVENTION

The present invention relates to a method and a device for the conversion of organic materials into gaseous or liquid fuels and in particular relates to the use of flash pyrolytic conversion of organic materials into gaseous or liquid fuels.

The conversion of organic waste into fuel by means of flash pyrolysis is a relatively new area of technology. There has, however, been some development in the general area of pyrolytic conversion of organic waste. One of the former methods of pyrolytic conversion for the production of gaseous fuels suggests loading waste organic materials into the top of a shaft furnace which is provided with an oxygen inlet at its lower end. Subsequent pyrolysis of the organic waste results in the formation of molten slag in the bottom of the furnace and a product gas comprising a fuel gas, oil, water vapor and fly ash. The product gas exits from the top of the furnace. The oil and the fly ash are removed from the product gas and recycled back to the furnace. The water vapor is subsequently removed in a condenser. Unfortunately, the resultant fuel gas has a heating value of only one-third of natural gas.

Another former method of pyrolytic conversion of organic waste involves low temperature pyrolysis. The organic waste is fed into the top of a vertical reactor where it is progressively dried, charred and finally oxidized at a relatively low temperature. These transformations occur while the organic material is settling under the force of gravity. The product gas which is formed at the lower end of the reactor rises, dries and chars the incoming organic waste. The resultant product gas leaving the reactor contains hydrogen, oxides of carbon, water vapor and a mixture of hydrocarbons. Since the product gas contains no ashy material, it may be cleanly burned in a secondary burner. The product gas may also be further processed to yield a gaseous mixture, containing hydrogen and carbon monoxide, which can then be used to synthesize methane.

Another former method of pyrolytic conversion of organic material into a fuel product involves high pressure, low temperature pyrolysis. The organic material is pulverized, mixed with water and pumped as a slurry into a reactor containing under pressure a carbon monoxide atmosphere or other suitable atmosphere. The organic material is subsequently pyrolized to produce an oil product. Residence time within the reactor is approximately 20 – 30 minutes. The resultant product oil is forced to the top of the reactor by incoming organic material and exits the reactor into appropriate separation equipment for removal of water vapor, ashe and carboneous char. The synthetic oil produced is a mixture of complex hydrocarbons.

Another former method utilizes a two reactor system to prevent the introduction of oxygen into the pyrolytic reactor. In this system the organic material is fed into the pyrolytic reactor which contains a heated fluidized sand/char bed. The organic material is subsequently pyrolized by the sand/char mixture to produce a fuel product. The sand/char mixture is removed from the reactor into a separate vessel for heating and recycled through connecting duct back to the pyrolytic reactor. The sand/char mixture thus provides the heat necessary for pyrolysis.

The above described methods of converting organic material into fuel have not been completely economical or technically viable. In the first three methods described, the product gas produced has a low heating value, ranging from approximately 350 – 550 Btu/Scf. This is due to the fact that the product gas contains a relatively large percentage of combustion gases such as carbon dioxide and nitrogen. Therefore, the product gas is not acceptable for gas pipeline application or as a substitute for natural gas. The last method described is for the production of a synthetic oil in a non-oxidizing atmosphere. This system does not appear to be economically or technically viable due to clogging, coke and sludge formation within the reactor and the excessive amount of heat required to vaporize the slurry mixture. The coke and sludge buildup occur inside the reactor and are caused by the conversion of the organic material into hard carbon or coke. The coke buildup and sludge formation prohibit efficient operation of the reactor and result in a reduction of heat transfer through the walls of the vessel. This reduction in heat transfer eventually results in a burn-through of the vessel walls which necessitates a shutdown of the reactor for repairs. Clogging occurs when a chunk of coke breaks off from the wall of the vessel and moves through the reactor until it encounters a restriction. Clogging will also eventually necessitate a shutdown of the reactor for repairs.

SUMMARY OF THE INVENTION

A principal object of the present invention is to produce a gaseous or liquid fuel product in a single self contained vessel wherein the problems of clogging, coke formation and sludge formation are substantially avoided.

A further object is to produce a gaseous or liquid fuel product which is not contaminated or diluted with products of combustion, i.e., carbon dioxide and nitrogen.

A further object is to provide an organic reactor wherein either a gaseous product or a liquid fuel can be produced.

A further object is to provide a single pressure vessel wherein the products of combustion and the fuel product produced are maintained in a separate uncontaminated condition.

These and other objects and advantages are accomplished by providing a process and an apparatus for converting organic waste material into a fuel product. The process comprises the steps of first forming under a pressure preferably above atmospheric pressure, a relatively high velocity stream of recycled product carrier gas and a mixture of dense, hard, abrasion resistant material heated to a temperature from between about 1600° to about 2000° F. Secondly, the organic material is introduced into the stream to result in an in-residence time of about ¼ to about 3 seconds. Lastly, the fuel product is separated and recovered from the stream.

The apparatus of the present invention comprises a housing having a reaction chamber and a combustion chamber. An inlet means is formed in the housing for the introduction of organic material into the reaction chamber. The reaction chamber is adapted to contain a heated stream of sand, dolomite and silicon or other hard, abrasion resistant and dense material. A means is positioned above the reaction cylinder to separate the resultant product fuel from the stream of sand and dolomite. A first outlet means is formed in the housing for the removal of the product fuel. The combustion chamber functions to heat the sand and dolomite and a second outlet means is formed in the housing for the removal of the combustion gases.

A more thorough disclosure of the objects of the present invention are presented in the detailed description which follows and from the accompanying drawings in which:

FIG. 2 is a cross section of an alternate embodiment of an organic gasification converter;

FIG. 3 is a cross section of an organic liquification converter.

DETAILED DESCRIPTION OF THE INVENTION

Figure 1:
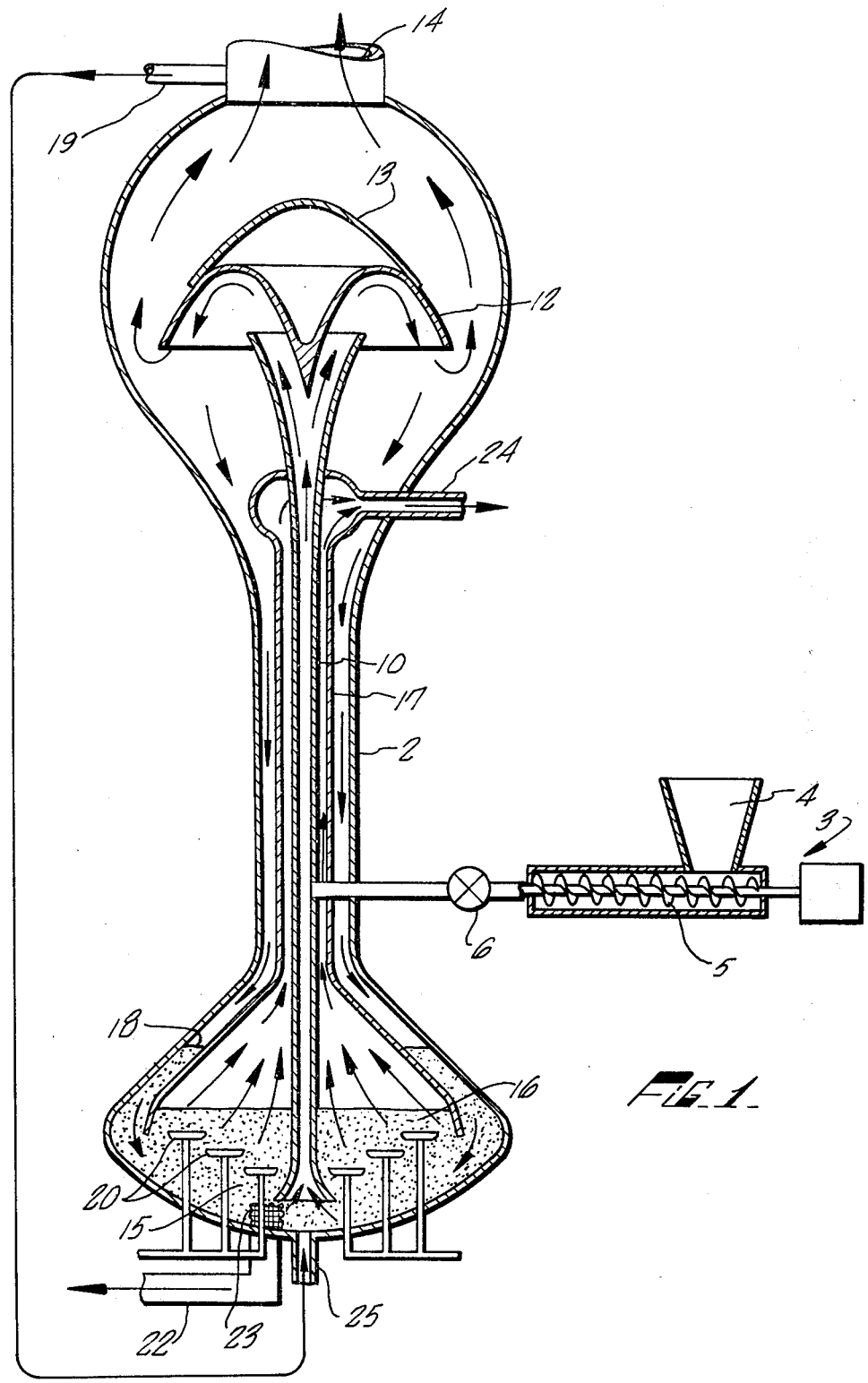
FIG. 1 is a cross section of an organic gasification converter.

The present invention relates to a method and an apparatus for converting organic waste materials into gaseous or liquid fuel products by flash pyrolysis of the organic material.

Although the apparatus is capable of converting any organic waste materials into a fuel product, including plastics, and rubber products, etc. Contaminants, i.e., metals, ceramics, inorganic materials, etc., should be removed by suitable and existing separation equipment prior to injection of the organic material into the apparatus. Failure to remove the contaminants will result in the necessity for continuous maintenance of the pyrolytic equipment. To avoid the cost of expensive separation equipment, it is preferred that clean organic waste material, i.e., animal waste and lumber slashes, be used as a starting material. The present apparatus can be operated in the gasification mode to produce a gaseous fuel product or in the liquification mode to produce an oil product. The present apparatus is used in conjunction with other accessory equipment such as heat exchangers, scrubbers, absorbers, quench towers, dryers, methanation units and feed preparation units. Since this equipment is well known to those skilled in the art, no further discussion of it is felt necessary in this disclosure.

Referring now to FIG. 1, there is shown a preferred embodiment of an organic converter capable of producing a gaseous fuel product. The converter is preferably enclosed in an essentially cylindrical or dumbell shaped, vertically positioned housing 2 and has two substantially concentric conduits formed therein which are concentric with the housing. The innermost conduit 10 functions as a pyrolysis chamber and the middle conduit 17 functions as a combustion cylinder. The organic material which preferably has been shredded or pulverized to a size of approximately 1/16–1/32 of an inch and pre-processed to reduce the moisture content to about 5 to 7%, is fed into the converter through injector 3 comprising a feeder screw 5 and the anti-backflow valve 6. The organic material can also be fed into the converter by a multiple plunger. Upon exiting the injector, the organic material enters reaction chamber 10 and encounters a stream of dense, hard, abrasion resistant, particulate material flowing along the length of the reaction cylinder. The material is preferably a sand/dolomite/silicon mixture but it will be obvious to one skilled in the art that other suitable materials may be used, i.e., carbide, ferrite, etc. The carrier gas for the sand/dolomite/silicon material is a recycled product gas. Although the converter may be operated at atmospheric pressure, the pressure inside the converter is preferably approximately 200–250 pounds per square-inch. The sand/dolomite/silicon mixture is conveyed through the pyrolytic chamber at a velocity of approximately 15–50 feet per second at a temperature of approximately 1600° to 2000° F. The organic material encounters the stream of sand/dolomite/silicon at an angle which is preferably essentially a 90° angle wherein the organic material is immeshed and brought into direct contact with the heat bearing sand/dolomite/silicon stream. As shown by the arrows, the smaller organic particles are then conveyed along the remaining length of the pyrolysis or reaction chamber 10 and are continually exposed to the heat of the sand/dolomite/silicon material for about ¼ to 3 seconds. Preferably the exposure time is less than 1 second. During this time interval the organic particles undergo rapid decomposition and volatilization due to a heat transfer rate from the sand/dolomite/silicon material of approximately 5,000 to 6,000 Btu per second, the abrasive and penetrating nature of the sand/dolomite/silicon material and the pressure which causes further particle reduction and rapid vaporization of entrained moisture. The decomposition is normally completed within 500 to 750 milliseconds after injection of the organic material into the reaction chamber. The decomposition results in the formation of product gas and char particles. The mixture of product gas, char particles, carrier gas and sand/dolomite/silicon exit from the top of the reaction chamber and enter a double parabolic shaped static cyclone 12. The static cyclone functions to separate the product gas from the char and sand/dolomite/silicon material and is provided with cover 13 to avoid excessive sand/dolomite/silicon buildup on the top of the cyclone 12. The product gas exits the converter through an aperture 14 formed at the top of housing 2. The converter is provided with means for introducing a backpressure on the existing product gas to maintain the desired internal pressure in the reactor. Approximately 10 to 15% of the product gas is recycled through a pressure differential pump (not shown) to the reaction chamber 10 through recycle conduit 19 to act as the sand/dolomite/silicon carrier. This differential pump provides a pressure differential of 15–30 p.s.i. and function to drive the recycle gas through the reaction chamber. The remaining product gas is further upgraded in heating value by shifting the carbon monoxide with steam to hydrogen and by methanating the carbon monoxide and hydrogen mixture to form methane. The product gas is then scrubbed of elucidated ash and minute particles of char and sent to a carbon dioxide absorber unit. The resultant product gas is comprised essentially of methane, hydrogen and ethane, along with some light oil factions. The resultant product gas has a heating value of approximately 800 to 850 Btu/Scf and is produced at a rate of about 8 Scf per pound of organic material. Production rate will, of course, be directly proportional to the caloric value of the organic input.

The flow of sand/dolomite/silicon/char mixture is reversed by the static cyclone wherein the mixture is directed towards the fluidized bed 15 of sand/dolomite/silicon/char through the cylindrical space defined by the housing 2 and combustion cylinder 17. The sand/dolomite/silicon/char mixture first encounters the bed 15 at the initial surface of seal 18 which is the dynamic seal between product gas and combustion gas and defines the level of solid material. This seal functions to prevent the admixing of the product gas with the combustion gas. The mixture then migrates down through the fluidized bed 15 into combustion chamber 16 of the converter. The heating zone is provided with restricted air inlets nozzles 20. With the introduction of air into the combustion chamber, the char in the sand/dolomite/silicon/char mixture undergoes combustion and reheats the sand/dolomite/silicon mixture to a temperature of approximately 1600° to 2000° F. The ash which is formed from the combustion of the char, is removed from the fluidized bed 15 through an aperture 23 to conduit 22. A mixture of sand/dolomite/silicon/ash is removed from the bed and sent to an air classifier for ash removal. The sand/dolomite/silicon may be reintroduced to the reactor through hopper 4. The combustion gas exits the combustion chamber 16 through a combustion cylinder 17 formed around reaction chamber 10, passes collection ring manifold and exits the housing 2 through combustion conduit 24. While exiting, the combustion gas which is a temperature of about 1500° F, functions beneficially to provide heat by radiation to reaction chamber 10. The combustion effluent gas is subsequently passed through a steam generator, air preheater and the dryer for the organic material (not shown). The combustion effluent gas is rich in heating value and may be utilized as a secondary fuel source or flared to the atmosphere.

The heated sand/dolomite/silicon mixture migrates and is drawn towards the center of the fluidized bed 15 where it is ultimately picked up by the recycled gas entering from the bottom of the housing through recycle conduit 25. The sand/dolomite/silicon mixture is then propelled through the reaction chamber 10 to repeat the cycle.

In FIG. 2 is shown an alternate embodiment of the organic gasification converter. Except for the static cyclone, all of the elements of this embodiment are the same as in FIG. 1 and function in the same way and therefore will not be discussed in detail. The static cyclone of the alternative embodiment comprises a conical shape member 30 and the arcuate top 32 of housing 2. As shown by the arrows, upon exiting the reaction cylinder, the flow of the sand/dolomite/char mixture is redirected by the conical shape member 30 so that it is deflected by the arcuate top of housing 2. The shape and geometry of the arcuate top may be varied to minimize the effect of erosion and to compensate for optimization of separation.

As shown in FIG. 3, a preferred embodiment of an organic liquification converter 15 enclosed in essentially a cylindrical or dumbell shape, vertically positioned housing 2. The operation of the liquification converter is similar to that of the gasification converter. The shredded and pre-processed organic waste material is fed into hopper 4 of injector 3 and is transported by feeder screw 5 passed an anti-backflow valve 6 into the reaction chamber 10. Upon entering the reaction chamber 10, the organic material encounters a stream of carbon monoxide laden recycle gas and sand/dolomite/silicon material preferably at essentially a 90° angle. The organic material is pulverized by direct contact with high velocity heated sand/dolomite/silicon material. The sand/silicon/dolomite mixture is at a velocity of approximately 15 to 50 feet per second and at a temperature of approximately 1600° to 2000° F. The pressure inside the reactor is approximately 2,000 to 2,500 pounds per square-inch. Upon injection into the reaction chamber, the organic material begins to decompose. Located immediately down stream from injector 3 is a steam inlet conduit 40. With the injection of saturated steam, the stream temperature is lowered to approximately 800° F, thereby creating the reaction conditions necessary for the conversion of the organic material into oil. In approximately 500 to 750 milliseconds after the addition of steam, the organic material reacts to form oil, char and a product gas. Under these reaction conditions, e.g., a lower temperature, a saturated water vapor atmosphere, a higher pressure and a carbon monoxide atmosphere, oil is the primary reaction product. The stream comprising a mixture of sand/dolomite/silicon, steam, oil, char and product gas exits from the top of the reaction chamber 10 and encounters the static cyclone comprised of conical shape member 30 and hooked-shape extensions 42 of housing 2. The cyclone separates the product gas, steam and the vaporized lighter oil fractions from the sand/dolomite/silicon, oil, char mixture.

The effluent gas comprised of the vaporized light oil fractions, product gas and steam exits through apertures 14 formed in the top of housing 2. Part of the effluent product gas is recycled through a pressure differential pump (not shown) to reaction chamber 10 through recycle conduit 19 to repeat the process. The differential pump provides a pressure differential of 65-85 p.s.i. and functions to drive recycled gas through the reaction chamber. The remaining effluent gas is expanded through a turbo compressor or similar apparatus to provide mechanical power for the organic injector, air compressor and the pump which recycles the effluent gas. The remaining effluent gas is then passed into a condenser where the water vapor is removed and to a water quench tower for the separation of the product gas from the light oil fractions. The resultant product gas produced will possess a heating value of approximately 550 Btu/Scf.

The mixture of sand/dolomite/silicon, char and product oil is returned by the static cyclone to the fluidized bed 15 located at the bottom of housing 2. The mixture first encounters the bed at the dynamic seal 18. This seal functions to prevent the admixing of the product gas with the combustion gas. The mixture will then slowly settle down into the center of the bed 15. The synthetic oil being in a highly heated liquid and low viscosity condition will percolate to the bottom of the fluidized bed 15 through the undisturbed section of the bed and will exit the housing 2 through a sandscreen 44 and oil conduit 45. The synthetic oil may be processed to remove the ash component or used directly in an electric utility steam generator. After removing the ash, the oil may be further processed or used as is in selected applications. Depending on the caloric value or the organic input, approximately 1 to 1.5 barrels of oil per ton of organic input will be produced.

The char will continue to migrate through the bed until it moves into the combustion chamber 16. Air is introduced into the combustion chamber 16 through air inlets 20. The air upon contact with the heated fluidized bed causes combustion of the char in the sand/dolomite/silicon/char fluidized bed. The combustion functions to reheat the sand/dolomite/silicon mixture. Due to the possibility of over heating, only a restricted quantity of air is provided into the combustion chamber. This results in incomplete combustion and temperature control and yields a combustion gas which is rich in carbon monoxide. Immediately above the surface bed 15 in the heating zone 16 is located conduit 50 for recycling a portion of the carbon monoxide rich combustion gas to the reaction chamber 10. This gas is drawn through conduit 50 by recirculating pump 52. The remaining combustion gas ascends through combustion cylinder 16 which is provided with a secondary air inlet 54. If desired, air may be introduced to cause a portion of the hydrocarbon gases in the combustion gas to be oxidized to provide further heat to chamber 10. The exhaust gas exits the converter through combustion conduit 24 and passes through a turbo-generator-compressor or other suitable apparatus for heat-pressure recovery. The heated sand/dolomite mixture continues to move through the bed towards the center of the fluidized bed where it is ultimately picked up by the recycled product gas and carbon monoxide rich combustion gas entering through recycle conduit 25 and propelled through the reaction chamber to repeat the cycle.

While embodiments and applications of this invention have been shown and described, it will be apparent to those skilled in the art that many more modifications are possible without departing from the inventive concept herein described. The invention, therefore, is not to be restricted except as is necessary by the prior art and by the spirit of the appended claims.

We claim:

1. Apparatus for the pyrolytic conversion of organic waste material into a fuel product comprising:

three generally vertically positioned substantially concentric conduits wherein the innermost conduit is open at both ends and forms a pyrolysis chamber, said pyrolysis chamber being provided with an organic waste material inlet means enabling the introduction of organic waste material into said innermost conduit from outside of said apparatus;

the middle conduit is open at the bottom end and forms a combustion chamber having oxygen inlet means positioned at the bottom thereof, said combustion chamber functioning to enable the regeneration of hard, dense, particulate matter by combustion and to enable heating of said pyrolysis chamber by channelling combustion gases through said combustion chamber along the outside of said pyrolysis chamber into a gas outlet chamber formed at the top end of said conduit closing off said top end said outlet chamber enabling the discharge of said combustion gases out of said apparatus, said innermost conduit extending through said gas outlet to open into the outermost conduit;

said outermost conduit closed at both ends to enclose said innermost and middle conduits and form a collecting chamber, said collecting chamber functioning to enable the recirculation of said hard, dense, particulate matter within said apparatus, said outermost conduit having a product outlet to enable removal of fuel product from said apparatus, and a char outlet at the bottom thereof to enable the removal of char from the apparatus;

an arcuate shaped static cyclone positioned over the top of said innermost conduit, said cyclone functioning to separate hard, dense, particulate matter exiting said innermost conduit from product gas exiting said innermost conduit;

a seal comprising a fluidized bed of said hard, dense, particulate matter and formed between said middle conduit and outermost conduit, said seal functioning to separate product gases from combustion gases.

2. The apparatus of claim 1 wherein said pyrolysis chamber is further provided with a steam inlet means downstream from said organic waste material inlet means.

3. The apparatus of claim 1 wherein said pyrolysis chamber is further provided with means to enable the recycling of a portion of the product gas through said pyrolysis chamber.

* * * * *